(12) United States Patent
Merritt

(10) Patent No.: US 9,174,160 B2
(45) Date of Patent: Nov. 3, 2015

(54) COLLAPSIBLE CORE, FILTER, AND METHOD

(75) Inventor: Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 745 days.

(21) Appl. No.: 12/543,579

(22) Filed: Aug. 19, 2009

(65) Prior Publication Data

US 2011/0042295 A1 Feb. 24, 2011

(51) Int. Cl.
*B01D 46/00* (2006.01)
*B01D 46/52* (2006.01)

(52) U.S. Cl.
CPC .......... *B01D 46/527* (2013.01); *B01D 46/0001* (2013.01); *B01D 2265/06* (2013.01)

(58) Field of Classification Search
CPC ............. B01D 46/527; B01D 46/0001; B01D 2265/06
USPC ........................... 156/184, 185, 189, 191, 194
See application file for complete search history.

(56) References Cited

U.S. PATENT DOCUMENTS

| | | | | |
|---|---|---|---|---|
| 3,006,464 | A * | 10/1961 | Snell | 242/160.1 |
| 3,144,934 | A * | 8/1964 | Shultz | 53/118 |
| 5,269,421 | A * | 12/1993 | Taylor | 206/411 |
| 5,435,870 | A | 7/1995 | Takagaki | |
| 5,543,007 | A | 8/1996 | Takagaki | |
| 6,224,705 | B1 * | 5/2001 | Kao et al. | 156/196 |
| 6,235,195 | B1 | 5/2001 | Tokar | |
| 6,348,084 | B1 | 2/2002 | Gieseke et al. | |
| 6,348,085 | B1 | 2/2002 | Tokar et al. | |
| 6,500,290 | B1 * | 12/2002 | Kao et al. | 156/196 |
| 6,547,857 | B2 | 4/2003 | Gieseke et al. | |
| 6,746,518 | B2 | 6/2004 | Gieseke et al. | |
| 6,966,940 | B2 | 11/2005 | Krisko et al. | |
| 7,001,450 | B2 | 2/2006 | Gieseke et al. | |
| 7,008,467 | B2 | 3/2006 | Krisko et al. | |
| 7,255,300 | B2 | 8/2007 | Johnston | |
| 2002/0100262 | A1 | 8/2002 | Gieseke et al. | |
| 2002/0184864 | A1 | 12/2002 | Bishop et al. | |
| 2004/0118771 | A1 | 6/2004 | Schukar et al. | |
| 2006/0090837 | A1 * | 5/2006 | Kao et al. | 156/184 |
| 2006/0091066 | A1 | 5/2006 | Driml et al. | |
| 2007/0039296 | A1 | 2/2007 | Schrage | |
| 2007/0193236 | A1 | 8/2007 | Merritt | |
| 2008/0011896 | A1 * | 1/2008 | Johnston et al. | 242/410 |
| 2008/0135471 | A1 | 6/2008 | Merritt et al. | |
| 2009/0114590 | A1 | 5/2009 | Merritt et al. | |

FOREIGN PATENT DOCUMENTS

| | | |
|---|---|---|
| EP | 1 712 266 A1 | 10/2006 |
| JP | H02-039522 | 3/1990 |
| JP | H03-275110 | 12/1991 |
| JP | H04-141239 | 5/1992 |

(Continued)

OTHER PUBLICATIONS

U.S. Appl. No. 11/634,647, filed Dec. 6, 2006, Merritt et al.

*Primary Examiner* — Jeff Aftergut
(74) *Attorney, Agent, or Firm* — Reinhart Boerner Van Deuren P.C.

(57) ABSTRACT

A collapsible winding core for a filter element is provided. A fluted filter media is wound about the collapsible winding core having a cylindrical shape. Subsequently, the collapsible winding core is collapsed into a generally flat shape to from the filter element having a racetrack shape.

3 Claims, 10 Drawing Sheets

(56) References Cited

FOREIGN PATENT DOCUMENTS

| | | |
|---|---|---|
| JP | 2007-020831 | 2/2007 |
| JP | 2008-174643 | 7/2008 |
| WO | WO 2004/082795 A2 | 9/2004 |
| WO | WO 2005/077487 A1 | 8/2005 |
| WO | WO 2008/095196 A1 | 8/2008 |

* cited by examiner

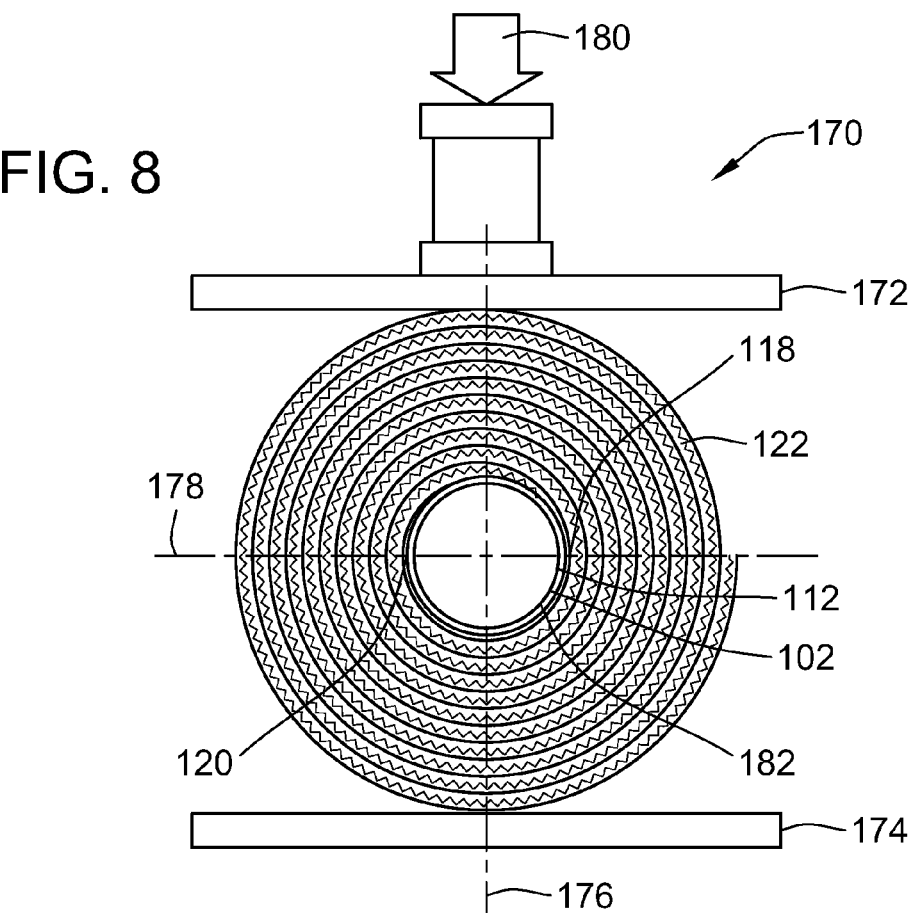
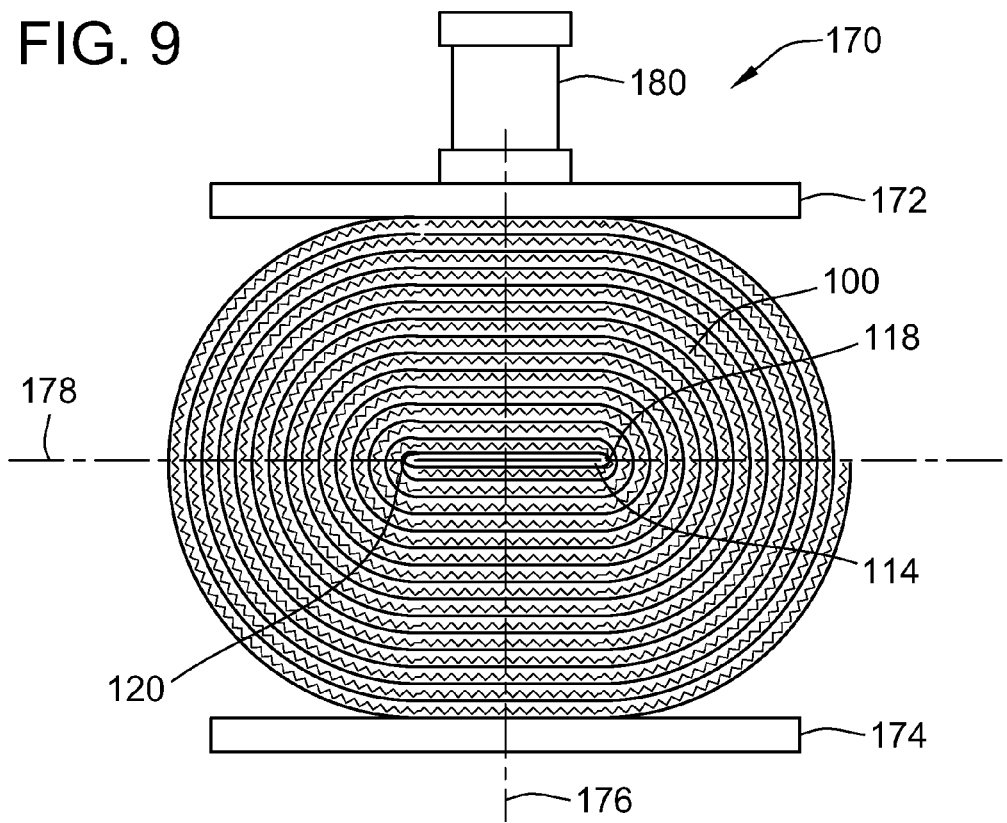

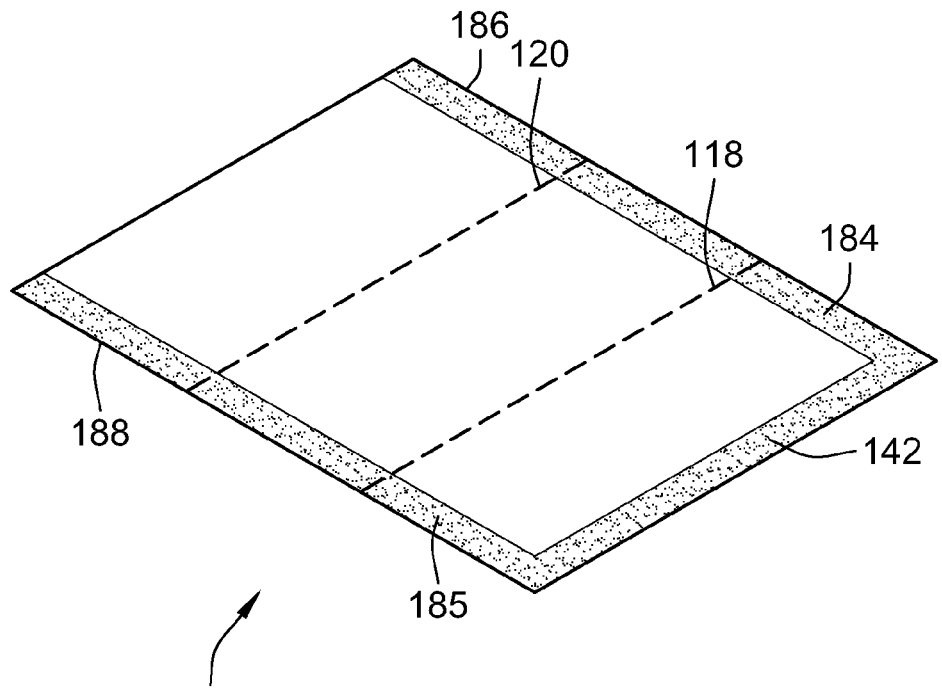
FIG. 10
FIG. 11
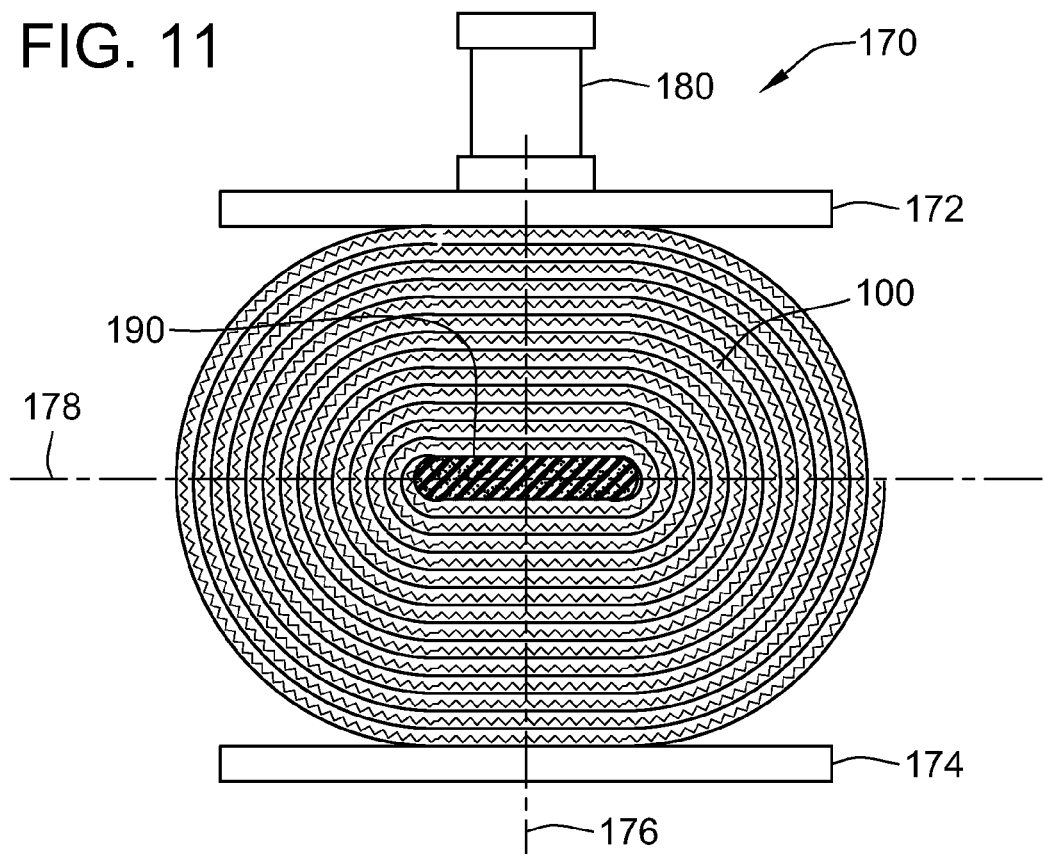

COLLAPSIBLE CORE, FILTER, AND METHOD

FIELD OF THE INVENTION

This invention generally relates to fluid filters for removing particulate matter from a flow of fluid in liquid or gaseous form, including filters of the type used for filtering inlet air supplied to machinery such as engines and compressors.

BACKGROUND OF THE INVENTION

Filters of the type used for filtering particulate matter from engine intake air sometimes include one or more layers of a porous filter material that is formed into a convoluted pattern, often referred to in the industry as fluted filter media.

In one commonly utilized form of a filter element, the filter element defines a longitudinal axis in first and second axial ends of the filter element, with the filter element including a central core, and a length of fluted filter media wound about the central core, with the flutes of the media oriented substantially longitudinal, thereby providing filtration for a flow of fluid passing axially through the filter element. Such filter elements are typically installed within a housing, or duct, in such a manner that the filter element can periodically be removed for cleaning or replacement with a fresh filter element. A seal between the filter element and the housing is typically provided, in such a manner that none of the fluid flowing through the housing can bypass the filter element, thereby ensuring all fluid passing through the housing enter one axial end of the filter element and exit from the opposite axial end of the filter element.

Where possible, filter elements of the type described above are typically formed into a circular cylindrical shape, with the filter media being wound about a round central core. In some applications, however, it is necessary to form filter elements into non-cylindrical shapes, to fit space constraints of the particular application. For example, in a racetrack shaped element, the cross sectional shape of the filter element is racetrack shaped, having a pair of curved semi-circular ends joined by a pair of straight segments. In such racetrack shaped filter elements, and in filter elements having other non-circular cross sectional shapes, such as oval or rectangular, for example, the length of fluted filter material is wound about a non-circular central core. Such non-circular central cores may have cross sections that are substantially rectangular in shape.

One prior approach to provide a racetrack shaped filter element was disclosed in U.S. Pat. Nos. 7,001,450; 6,746,518 and 6,547,857 to Gieseke et al., wherein a fluted filter media is coiled about a rectangular shaped center board. As is well known in the art, and stated in the patent to Gieseke et al., fluted filter media typically exhibits an inherent shape memory which can cause the media to bow outwardly, radially, away from the center board. In a filter element having a cylindrical central core, this inherent curvature memory is typically not problematic, in that the curvature of the media will not interfere with, and may actually assist in, pulling the media down onto the core, or onto a previously wound layer of the media.

Another prior approach to forming a racetrack shaped filter element is shown in U.S. Pat. Nos. 7,008,467 and 6,966,940 to Krisko et al. Krisko et al. uses a core construction including a racetrack shaped non-cylindrical wall member having opposing walls defining an open volume within the non-cylindrical member. In cross section, the non-cylindrical member has the appearance, generally, of a flattened cylindrical shaped tube having flat opposing side walls joined at opposite ends by curved walls, surrounding the open volume. The core construction of Krisko et al. further includes structural moldings and plugs located within the open volume, for providing strength, and axially closing off the open volume to ensure that fluid cannot leak through the open volume inside of the non-cylindrical member.

The center core construction of Krisko et al. is even more complex than the center board of Gieseke et al. as described above. The core construction of Krisko et al. also appears to include a substantial volume of axis material, making such a core construction undesirably expensive to produce and heavier then necessary. The core construction of Krisko et al. can result in a significant amount of extra material which must be disposed of or incinerated when the filter element is replaced.

Because the central core is essentially a non-operating part of the completed filter, it is desirable that the central core be fabricated at minimum cost, utilizing as little material as possible, and having a configuration which can be readily manufactured in a form that is also readily disposable or incinerable. It is also desirable, in some applications, that the central core be fabricated in a manner which is as light in weight as possible.

It is desirable, therefore, to provide an improved method and apparatus for manufacturing a fluid filter element having a non-cylindrical elongated shape such as a racetrack shape, in a manner which overcomes one or more of the problems discussed above, and/or provide improved utility over the prior art.

BRIEF SUMMARY OF THE INVENTION

The present invention provides an improved method and apparatus for forming a filter element having an elongated shape such as a racetrack shape. The improved method and apparatus involves a collapsible winding core having a cylindrical preassembled state and a generally flat collapsed state. In the method of winding the filter media using the collapsible winding core according to an embodiment of the present invention, the fluted filter media is wound about a cylindrical preassembled collapsible core, thus avoiding the fluted filter media's inherent shape memory problems when a prior generally flat center board is used as discussed above. Further, the collapsible winding core in some embodiments can also reduce the overall manufacturing cost, since it can be formed of a relatively inexpensive material such as a paperboard, in a simple cylindrical shape configured to fit conventional cylindrical rollers of winding machines, thereby eliminating a need of special winding apparatus to accommodate a particular non-cylindrical winding core.

In one aspect, the invention provides a method of forming a filter element. The method includes steps of providing a collapsible winding core, winding a fluted filter media about the collapsible winding core to form an intermediate filter element, and collapsing the intermediate filter element.

In another aspect, the invention provides a filter element comprising a collapsible winding core and a fluted filter media wound about the collapsible winding core.

In yet another aspect, the invention provides a collapsible winding core for a filter element. The collapsible core includes a preassembled cylindrical core body and a collapsed generally flat core body.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 8 is a perspective end view of a collapsing station loaded with the intermediate filter element of FIG. 4;

FIG. 9 is a perspective end view of the collapsing station of FIG. 8 after application of a force to collapse the filter element into a racetrack shape;

FIG. 10 is a perspective view of a flat winding core material applied with adhesive strips prior to being wound into a collapsible winding core according to an embodiment of the present invention;

FIG. 11 is a perspective end view of the racetrack shape filter element of FIG. 9, wherein axial ends of the collapsed winding core are sealed by a sealing material according to an embodiment of the present invention;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
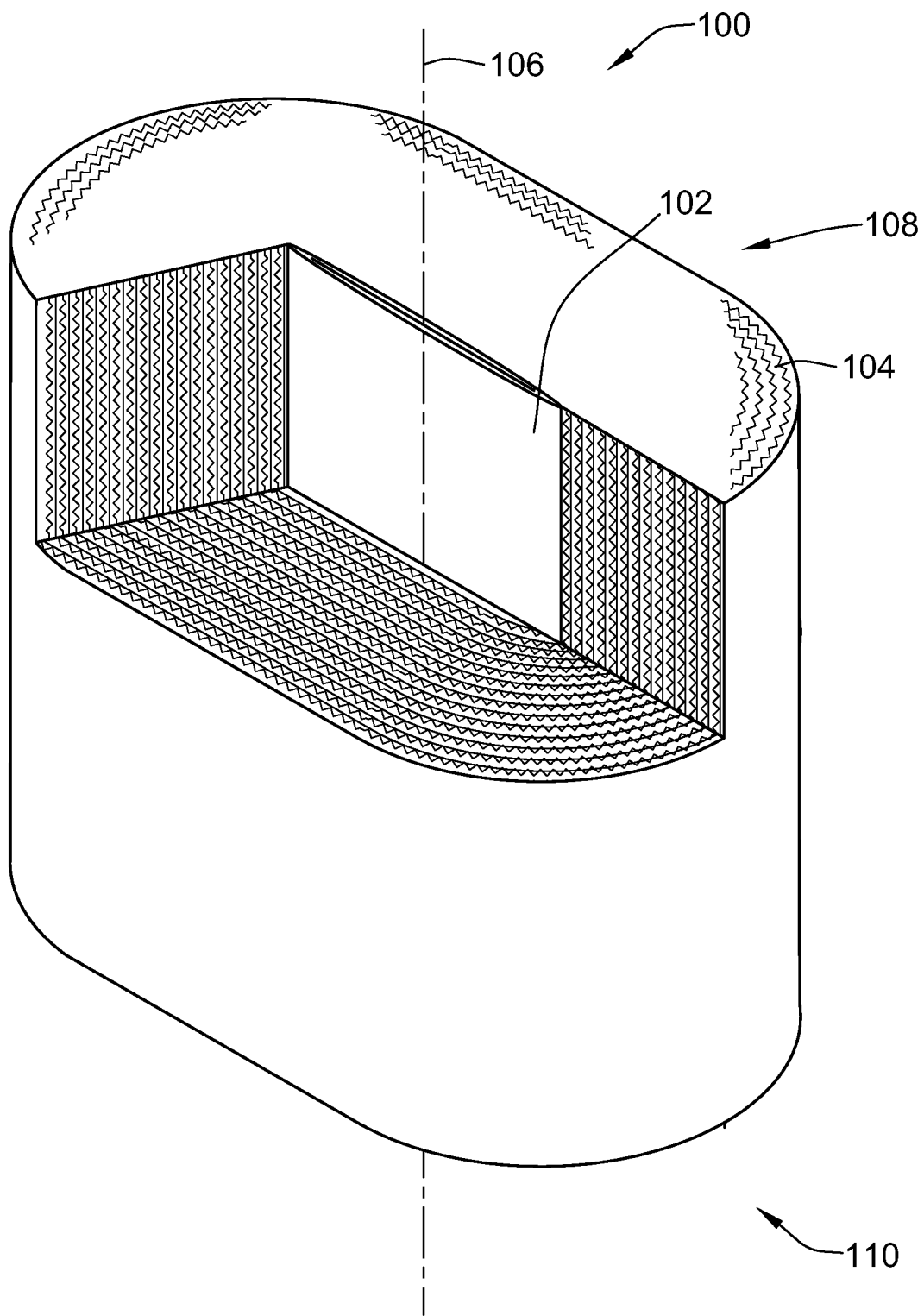
FIG. 1 is a perspective view of a filter element having a racetrack shape including a collapsible winding core according to an embodiment of the present invention, with a section of the filter removed to show a partial cross-section.

FIG. 1 shows a filter element 100 according to one embodiment of the present invention. The filter element 100 includes a fluted filter media 104 wound about a collapsible winding core 102. The filter element 100 defines a longitudinal axis 106, first axial end 108, and second axial end 110. As shown, the flutes of the fluted filter media 104 is arranged substantially longitudinally to the longitudinal axis 106 of the filter element 100, to provide for filtration of a flow of fluid passing axially through the filter element 100. The fluted filter media 104 is typically formed by winding a convoluted sheet and a face sheet about an axis to form a plurality of contiguous adjacent flutes. In such fluted filter media 104, alternating ends of adjacent flutes are blocked to cause fluid entering one open end of "inlet" flutes to flow through the porous filter media into adjacent "outlet" flutes prior to exiting the filter media at an opposite end of the flutes.

Figure 2:
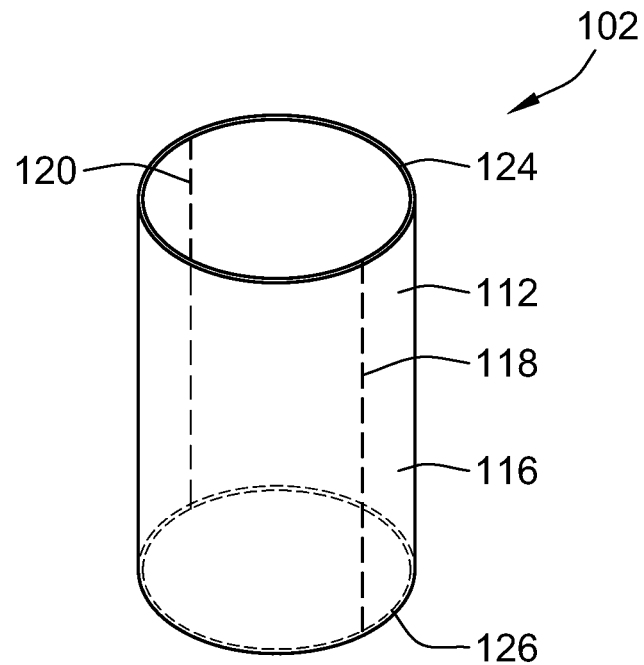
FIG. 2 is a perspective view of the collapsible wining core of FIG. 1 in the preassembled state.
Figure 3:
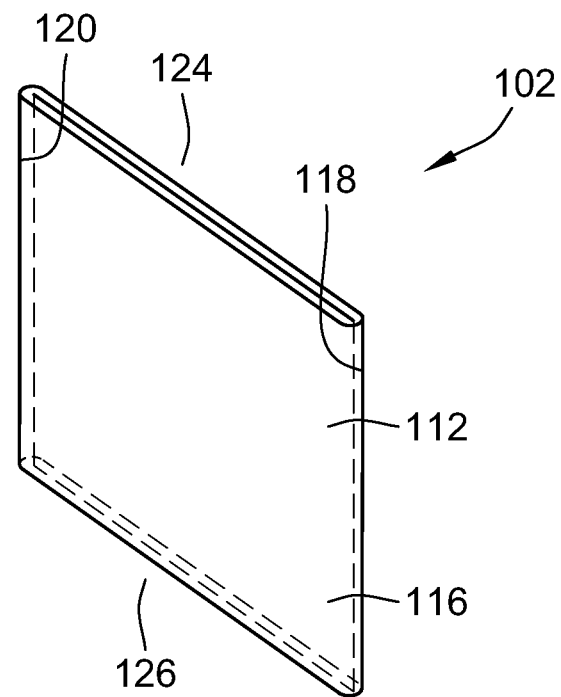
FIG. 3 is a perspective view of the collapsible winding core of FIGS. 2-3 in the collapsed state.

The collapsible winding core 102 has a preassembled state 112, as shown in FIG. 2, and a collapsed state 114, as shown in FIG. 3. In one embodiment, the collapsible winding core 102 has two fold lines 118, 120, as shown in FIGS. 2-3. The collapsible winding core 102 in the preassembled state 112 may also be referred to as a preassembled collapsible core or a precollapsed collapsible core or precollapsed cylindrical core body or other similar terms in this application. As shown in FIG. 2, the collapsible winding core 102 in the preassembled state 112 has a cylindrical body and two parallel fold lines 118, 120 extending from a first axial end 124 to a second axial end 126. Although the collapsible winding core 102 in this embodiment is shown with two fold lines 118, 120, the collapsible winding core 102 may not include any fold line or include only one fold line or include more than two fold lines in other embodiments. The collapsible winding core 102 may be formed of a suitable material such as a plastic, paper, metal, etc. Preferably, the collapsible winding core 102 is formed of a paperboard material. The paperboard material may be coated or laminated with a plastic material in some embodiments. The fold lines 118, 120 may be a crease line, perforations, or a score line partially cutting through the thickness of the collapsible winding core material.

Figure 4:
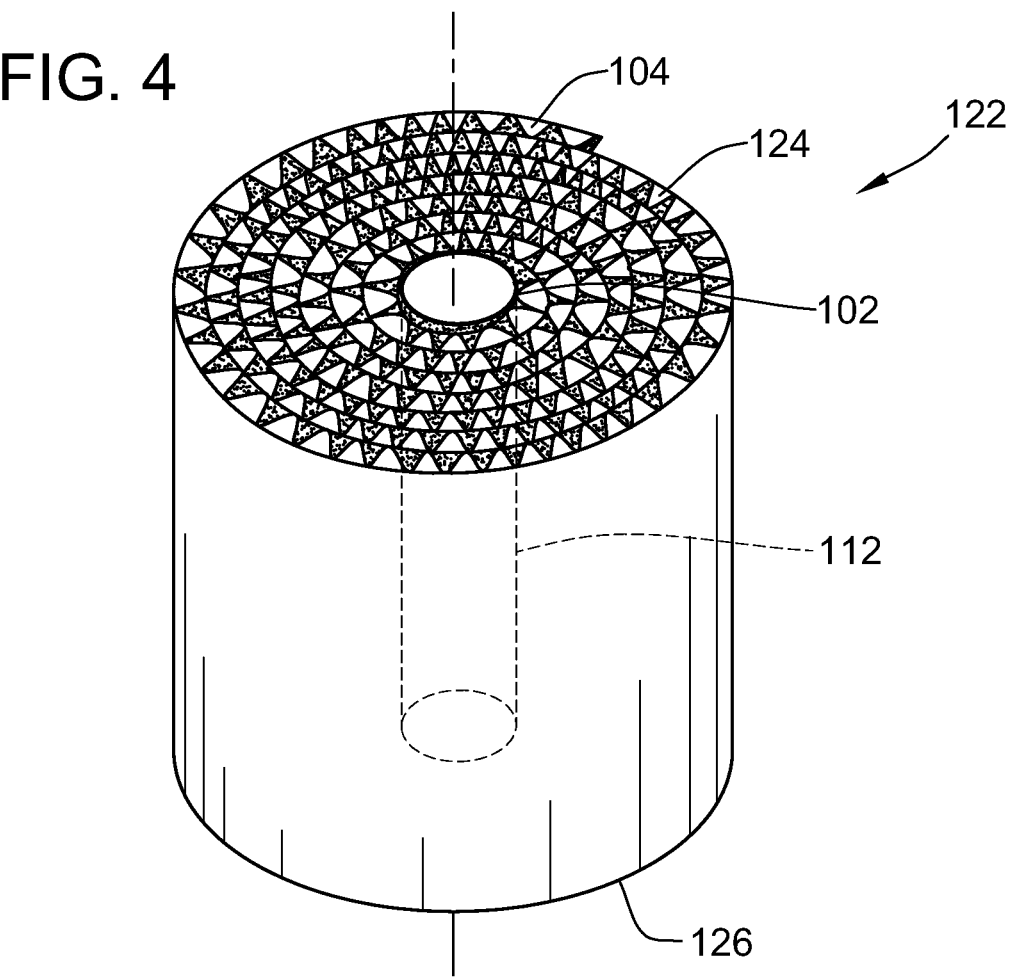
FIG. 4 is a perspective view of the filter element of FIG. 1 in intermediate state.

The fluted filter media 104 is wound about the collapsible winding core 102 in the preassembled state 112, forming an intermediate state filter element 122 having a cylindrical shape, as shown in FIG. 4. The intermediate state filter element 122 may be used in some filtration applications requiring a cylindrical shape filter element. In other applications requiring a racetrack like shaped filter element, the intermediate state filter element 122 can be collapsed to form the filter element 100, as shown in FIG. 1.

In one embodiment, a method of forming a filter element includes providing a collapsible winding core, winding a fluted filter media about the collapsible winding core to form an intermediate filter element, and collapsing the intermediate filter element. In the past, various winding cores for a racetrack like filter element have been developed, such as a substantially flat plastic winding core disclosed in U.S. patent application Ser. No. 11/634,647, which is assigned to the present assignee, the disclosures of which are hereby incorporated by reference in their entireties. However, such non-cylindrical winding cores required a customized winding apparatus to accommodate the particular shape of the winding core. Unlike these non-cylindrical winding cores, the collapsible winding core of the present invention can be formed to fit various cylindrical rollers of conventional filter element manufacturing machines or any other web winding machines. Therefore, the method of forming the filter element using the collapsible winding core of the present invention can reduce manufacturing cost by eliminating the need of a special winding apparatus.

Figure 5:
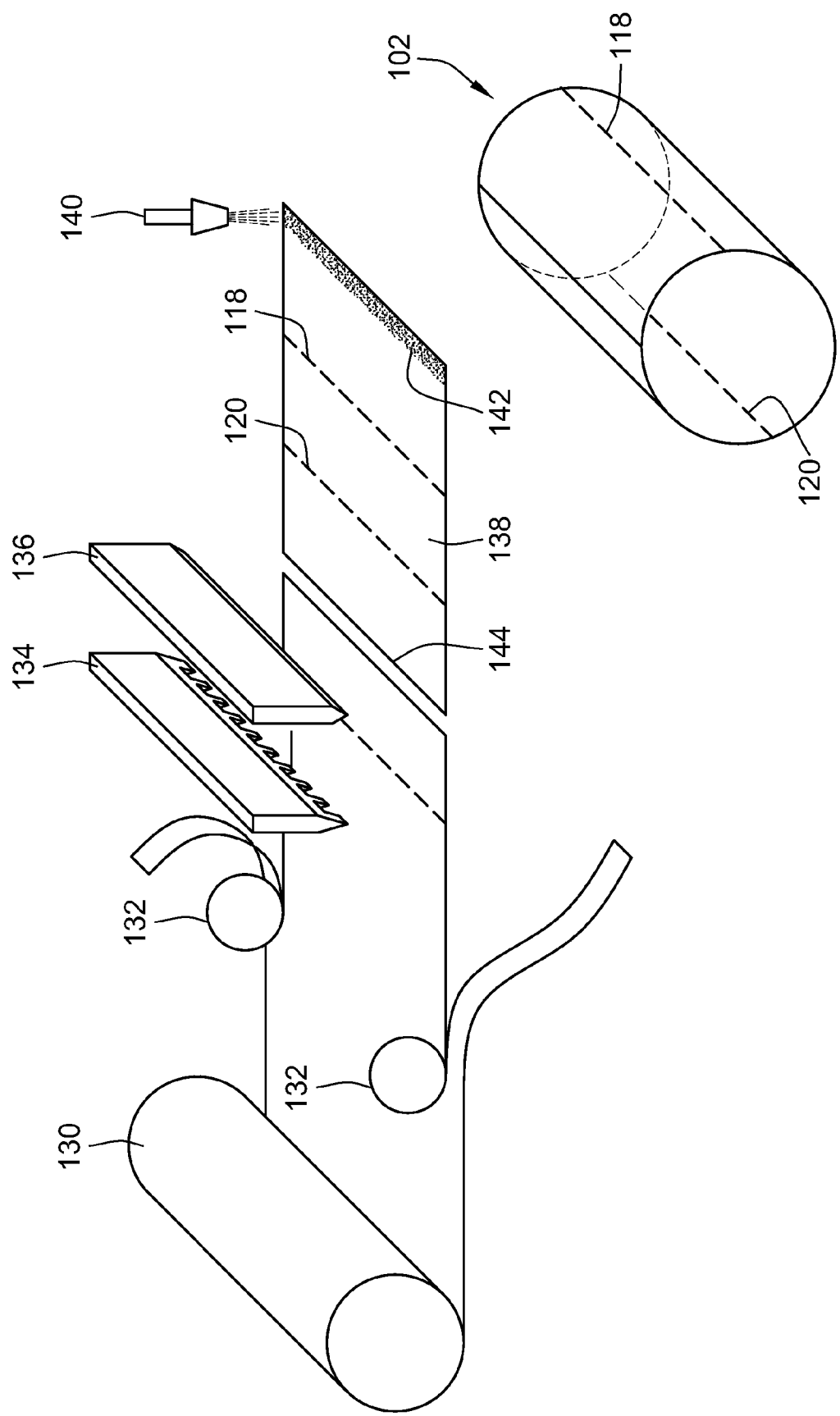
FIG. 5 is a schematic illustration of a process line for forming the collapsible winding core of FIGS. 1-4 according to an embodiment of the present invention.

As discussed above, the collapsible winding core may be formed of any suitable material and may include one or more fold lines as shown in FIG. 2. In this embodiment, the collapsible winding core 102 is formed of a plastic coated paperboard and includes two fold lines 118, 120. The fold lines 118, 120 are adapted to facilitate the collapsing process of the intermediate filter element 122 (FIG. 4) in a predetermined and predictable manner along the fold lines. The winding core 102 may be formed using any suitable conventional manufacturing process. FIG. 5 schematically shows a process line for providing the collapsible winding core 102 according to one embodiment of the present invention. In this embodiment, a roll of a plastic coated paperboard material 130 is trimmed to a desired width using a set of trimming knives 132. Then, the trimmed plastic coated paperboard material passes through a perforation knife 134, wherein the fold lines 118, 120 are formed. The plastic coated paperboard material is then cut to a desired length at a cutting station 136, forming a rectangular sheet 138. Finally, a suitable adhesive is applied to one end of the rectangular sheet 138 along its width at an adhesive station 140, and rolled into a cylindrical shape. During the rolling step, the adhesive applied edge 142 is overlapped with the opposite edge 144 of the rectangular sheet 138 such that the adhesive 146 is between two edges 142, 144 to secure the edges together, thereby forming the collapsible winding core 102 in the preassembled state 112.

Figure 12:
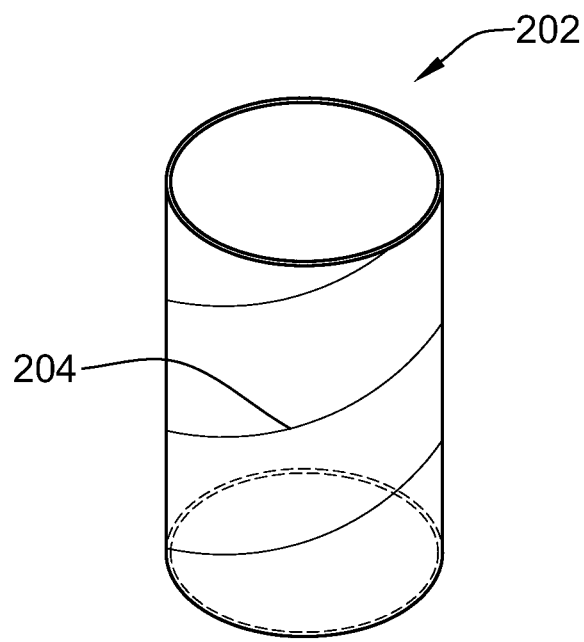
FIG. 12 is a perspective view of a collapsible winding core in a preassembled state according to an embodiment of the present invention.

In a different embodiment, a collapsible core 202 is formed of a suitable material, preferably a paperboard material, without any fold lines, as shown in FIG. 12. The collapsible core 202 can be made on a typical coremaking line and comprise inner and outer plies of paperboard material superimposed in face-to-face relationship. Each ply of the paperboard is supplied to a coremaking mandrel from a spool of raw material. When the two plies are fed to the coremaking mandrel, they are typically helically wrapped in the same direction. During wrapping, the plies are adhered throughout to maintain the desired cylindrical configuration. As such the collapsible core 202 includes a helical boarder 204 between the plies of paperboard material.

Figure 6:
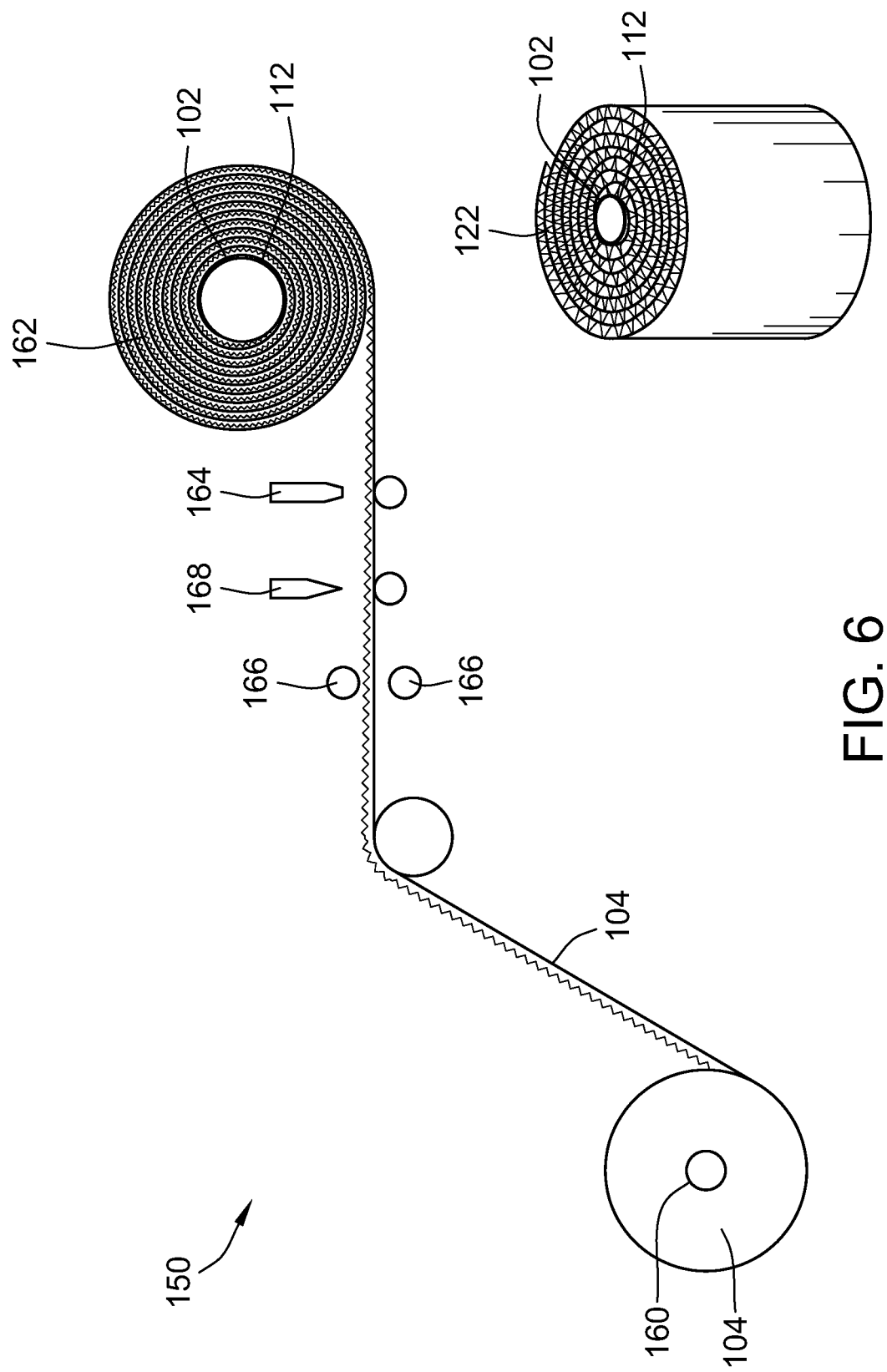
FIG. 6 is a schematic illustration of a winding apparatus for winding the intermediate filter element of FIG. 4.
Figure 7:
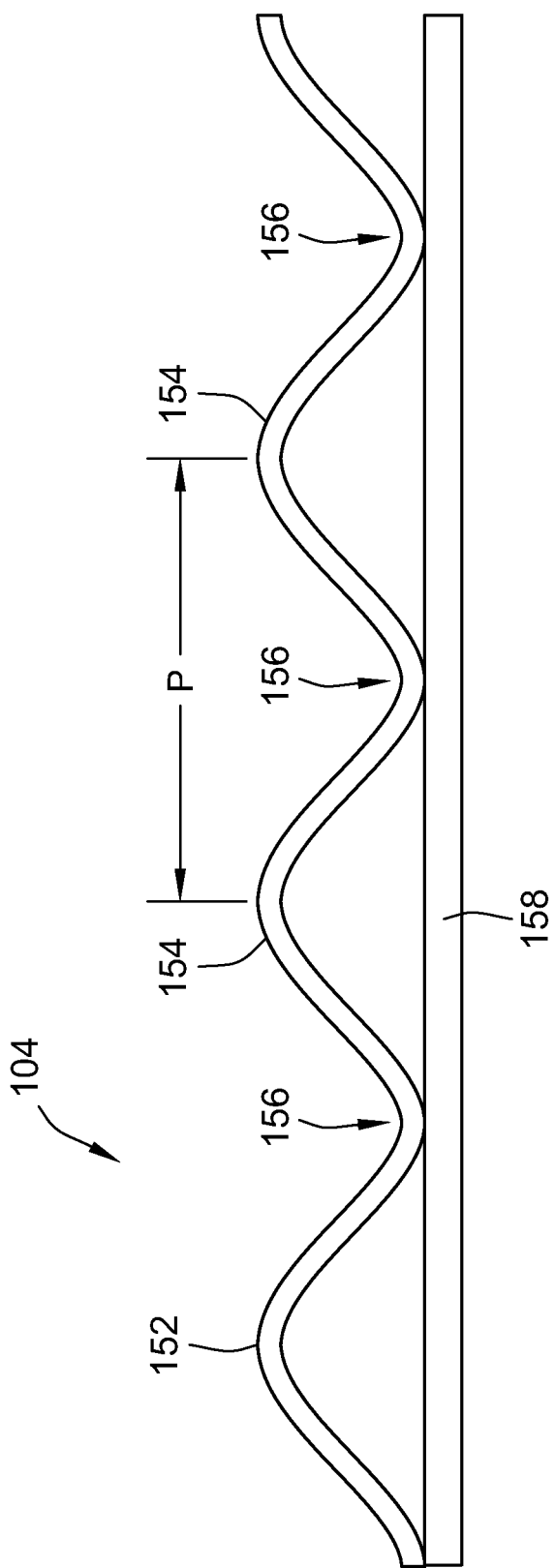
FIG. 7 is an enlarged view of a fluted filter media wound about the collapsible winding core of FIG. 1.

FIG. 6 illustrates a winding apparatus 150 for winding the fluted filter media 104 using the collapsible winding core 102 according to one embodiment of the present invention. FIG. 7 shows the fluted filter media 104, used herein for describing the exemplary embodiment of the invention, including a convoluted sheet 152 of porous filter material, forming peaks 154 and valleys 156, attached to a face sheet 158. As shown, adjacent peaks 154 are regularly spaced from one another at a pitch "P". The term "face sheet", as used herein, is intended to encompass any form of sheet or strip of generally flat, porous or non-porous, material attached to the fluted sheet of porous filter material. In most embodiments of the invention, the face sheet would preferably be formed of a porous filter material. The convoluted sheet 152 may be formed by any appropriate process, such as corrugating or pleating, but preferably by gathering as described in U.S. Patent Publication No. 2006/0091066, entitled "Gathered Filter Media for an Air Filter and Method of Making Same," assigned to the assignee of the present invention, and incorporated herein by reference. As will be understood by those having skill in the art, the invention may also be used with other types of filter media, in other embodiments of the invention.

The winding apparatus 150 of FIG. 6 includes an unwinder 160, a rewinder 162, an adhesive applicator 164, a set of nip rollers 166, and a cutter 168. In the winding apparatus 150, the collapsible winding core 102 in its preassembled state 112 having a cylindrical body as shown in FIG. 2 is inserted on the rewinding 162 comprising a cylindrical roller. A roll of fluted filter media 104 is unwound from the unwinder 162. A leading edge of the fluted filter media 104 is attached to the collapsible winding core 102 with an adhesive/sealant and wound by the rewinder 162. Alternatively, the leading edge of the fluted filter media 104 may be attached using a suitable tape. Yet in a different embodiment, the leading edge of the fluted filter media 104 may not need to be attached using an adhesive, a sealant, or a tape for the winding process. For example, the rewinder 162 can be configured to mechanically hold the fluted filter media 104 and the collapsible winding core 102 together during winding. In such embodiments, the axial ends of the filter element can be sealed after the assembly. As the web of fluted filter media 104 travels, the adhesive applicator 164 applies an adhesive/sealant on the web of the fluted filter media 104. The term adhesive/sealant, as used herein, is intended to be inclusive rather than limiting, and includes any material that is applied through the applicator 164 for purposes such as structurally bonding together the layers of a filter media, or for providing a complete or partial seal against the flow of fluid through a filter element according to the invention. Once a desired amount of the filter media 104 is wound on the collapsible winding core 102, the set of nip rollers moves toward the web of the fluted filter media 104 to hold the web while the cutter 168 cuts the web. The intermediate filter element 122 having a cylindrical shape as shown in FIGS. 4 and 6 is unloaded from the rewinder 162.

After being removed from the rewinder 162, the intermediate filter element 122 is transported to a collapsing station 170, as shown in FIGS. 8-9. The collapsing station 170 includes a top plate 172 and a table 174. The intermediate filter element 122 is placed on the table 174 such that the fold lines 118 and 120 are on a major axis 178, which is parallel to the surface of the table 174. Then the top plate 172 moves down towards the intermediate filter element 122 and applies a force 180 such that the intermediate filter element 122 is pressed along a minor axis 176. As the force 180 is applied, the collapsible winding core 102 folds along the fold lines 118, 120, and the cylindrical intermediate filter element 122 slowly elongates along the major axis 178. Finally, the collapsible winding core 102 collapses to the generally flat collapsed state 114, thereby forming a racetrack like filter element 100, as shown in FIG. 9.

In one embodiment, a suitable adhesive is applied on an inner surface 182 (FIG. 8) of the collapsible winding core 102 in its preassembled state 112 before being pressed in the collapsing station 170, wherein the adhesive holds the filter element 100 in the racetrack like shape after being removed for the collapsing station 170. The suitable adhesive may include a water based adhesive, a solvent based adhesive, a hot melt adhesive, glue, etc. In an embodiment, the adhesive is applied as a continuous thin layer on the entire inner surface of the collapsible winding core 102. As such, the thin layer of adhesive also provides a sealing function for the inside of the collapsible winding core 102. In a different embodiment, strips of adhesive 184, 185 are applied on a flat core material 103 prior to being wound into a cylindrical collapsible core 102. As shown in FIG. 10, the strips of adhesive 184, 185 are provided proximate edges 186, 188, such that when the collapsible winding core 102 is collapsed after the fluted filter media 104 is wound about the collapsible winding core 102, the adhesive strips 184, 185 seal the first axial end 108 and the second axial end 110 of the collapsed winding core 102 to prevent fluid bypassing.

In a different embodiment, a suitable sealing material 190 is applied on each end of the collapsed winding core 102 to seal the axial ends as shown in FIG. 11. The suitable sealing material 190 may include an urethane foam or other polymeric sealing materials. In other embodiments, a filter housing (not shown) may include a set of caps adapted to fit axial ends of the collapsible winding core 102 to prevent any bypassing of fluid through a gap in the collapsible winding core 102.

Figure 13:
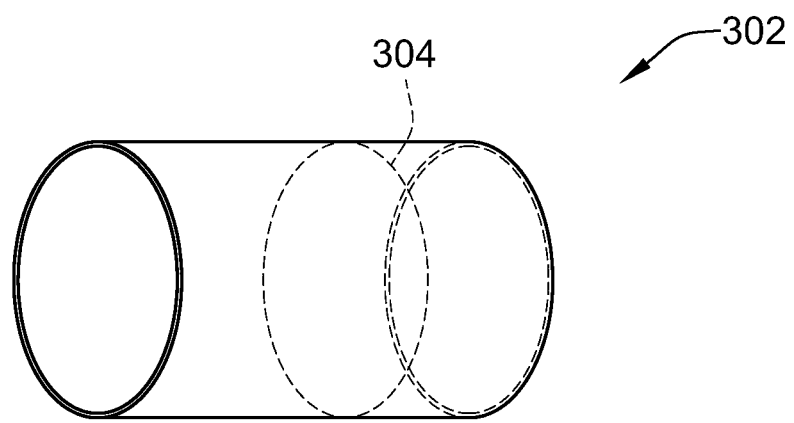
FIG. 13 is a perspective view of a collapsible winding core including a radial perforation line according to an embodiment of the present invention.

In another embodiment, a collapsible core 302 includes a radial perforation line 304 as shown in FIG. 13. Although the embodiment of FIG. 13 is shown with one radial perforation line 304 circumscribing the body of the collapsible core 302, other embodiments may include two or more radial perforation lines. Further, the radial perforation lines may be formed angularly such that they are not parallel to the axial ends of the collapsible core in some embodiments. As it was with the previous embodiments, the collapsible core 302 can be formed of any suitable material such as a plastic material or a paperboard material. The radial perforation line 304 is formed to cut through the thickness of the collapsible core 302.

Figure 14:
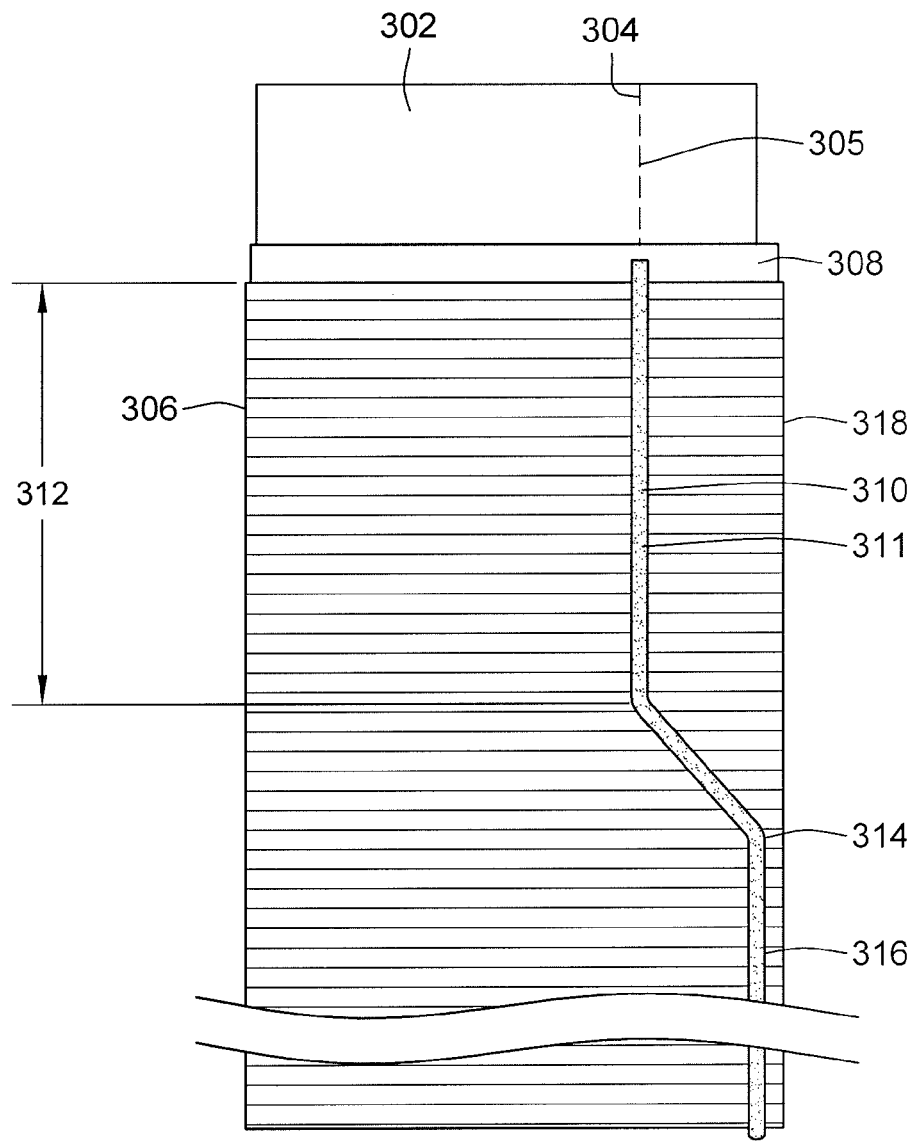
FIG. 14 is a top perspective view of the collapsible winding core of FIG. 13 with a leading edge of a fluted filter media attached thereon, wherein a bead of adhesive/sealant is applied according an embodiment of the present invention.

FIG. 14 illustrates a fluted filter media 306 and the collapsible core 302, wherein a leading edge 308 is attached to the collapsible core 302 for the winding process. As shown, a bead of adhesive/sealant 310 is applied using an applicator (not shown) along the fluted filter media 306 at an axial position 311 corresponding to an axial position 305 of the perforation line 304. The applicator (not shown) moves longitudinally along the axial position 311 on the fluted filter media 306 applying the adhesive/sealant for a distance 312, which is substantially equal to a circumference of the collapsible 302. As the fluted filter media 306 is wound about the collapsible core 302, the bead of adhesive/sealant 310 attaches the fluted filter media 306 to the collapsible core 302 along the perforation line 304. Further, a pressure applied on the bead of adhesive/sealant 310 by the subsequent layers of the fluted filter media 306 facilitates the adhesive/sealant to seep through the perforations 304. As indicated in FIG. 14, after wrapping the fluted filter media 306 at least once completely about the collapsible core 302, the applicator (not shown) moves axially toward a second axial position 314 such that a bead of adhesive/sealant 316 blocks some flutes proximate one axial end 318 of a filter element. In some embodiments, the applicator (not shown) may start applying the adhesive/sealant on the collapsible core 302 along the perforation line 304, and continue the application on the fluted filter media 306 along the corresponding axial position as described above. In such embodiments, an amount of adhesive seeping through the perforations is increased as more adhesive/sealant is applied along the perforation line.

After the winding process, an intermediate state filter element having the collapsible core 302 is collapsed as described in the previous embodiments. When the intermediate state filter element is collapsed to a filter element having a racetrack like shape, the adhesive/sealant which seep through the perforation line 304 bonds the inner surface of the collapsed core 302 along the perforation line 304, thereby sealing the collapsed core 302 and holding the filter element in the racetrack like shape. Additional sealant may also be applied on one or both axial ends of the collapsed 304 core to further seal the axial ends of the filter element as described above.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of forming a filter element comprising:
providing a collapsible winding core;
winding a fluted filter media about the collapsible winding core to form an intermediate filter element;
collapsing the intermediate filter element;
wherein the filter element is formed having an inlet face and an outlet face after said collapsing wherein fluid flowing from the inlet face to the outlet face must pass through the fluted filter media and thereby be filtered, the collapsible winding core being disposed between the inlet face and the outlet face;
sealing the collapsible winding core to prevent any bypassing of unfiltered fluid through the collapsible winding core in the finished filter element for fluid flow between the inlet face and the outlet face;
applying sealant to an outside surface of the collapsible winding core and allowing the sealant to seep through the collapsible winding core to an inner surface thereof to provide said sealing of the collapsible winding core; and
providing perforations in the collapsible winding core and allowing sealant to seep through said perforations.

2. A method of forming a filter element comprising:
providing a collapsible winding core;
winding a fluted filter media about the collapsible winding core to form an intermediate filter element;
collapsing the intermediate filter element;
wherein the filter element is formed having an inlet face and an outlet face after said collapsing wherein fluid flowing from the inlet face to the outlet face must pass through the fluted filter media and thereby be filtered, the collapsible winding core being disposed between the inlet face and the outlet face;
sealing the collapsible winding core to prevent any bypassing of unfiltered fluid through the collapsible winding core in the finished filter element for fluid flow between the inlet face and the outlet face; and
applying a strip of sealant along an inner surface of the collapsible winding core prior to collapsing, wherein collapsing the intermediate filter element causes strip of sealant to seal the inner surface to provide said sealing the collapsible winding core.

3. The method of claim 1, further comprising:
fabricating the collapsible winding core from a flat core material;
winding the flat core material into the collapsible winding core;
prior to said winding the flat core material, applying said strip of sealing along the inner surface.

\* \* \* \* \*